(12) United States Patent
Liu et al.

(10) Patent No.: US 7,090,355 B2
(45) Date of Patent: Aug. 15, 2006

(54) SYSTEM AND METHOD FOR A TRANSPARENT COLOR IMAGE DISPLAY UTILIZING FLUORESCENCE CONVERSION OF NANO PARTICLES AND MOLECULES

(75) Inventors: Jianqiang Liu, Campbell, CA (US); Xiao-Dong Sun, Fremont, CA (US)

(73) Assignee: Superimaging, Inc., Fremont, CA (US)

( * ) Notice: Subject to any disclaimer, the term of this patent is extended or adjusted under 35 U.S.C. 154(b) by 154 days.

(21) Appl. No.: 10/848,489

(22) Filed: May 18, 2004

(65) Prior Publication Data
US 2004/0232826 A1 Nov. 25, 2004

Related U.S. Application Data

(60) Provisional application No. 60/471,968, filed on May 19, 2003.

(51) Int. Cl.
*G03B 21/14* (2006.01)
(52) U.S. Cl. ............... 353/79; 353/122; 353/452
(58) Field of Classification Search ............ 353/122, 353/31, 34, 37, 11, 12, 79; 359/443–461
See application file for complete search history.

(56) References Cited

U.S. PATENT DOCUMENTS

| | | | |
|---|---|---|---|
| 3,598,995 A | 8/1971 | Inoue et al. | |
| 3,881,800 A | 5/1975 | Friesem | |
| 3,953,117 A | 4/1976 | Cannon | |
| 4,158,210 A | 6/1979 | Watanabe et al. | |
| 4,689,522 A | 8/1987 | Robertson | |
| 4,713,577 A * | 12/1987 | Gualtieri et al. ........... | 313/468 |
| 4,814,666 A | 3/1989 | Iwasaki et al. | |
| 4,960,314 A | 10/1990 | Smith et al. | |

(Continued)

FOREIGN PATENT DOCUMENTS

JP 4281422 10/1992

OTHER PUBLICATIONS

"A Three-Color, Solid-State, Three-Dimensional Display" E. Downing et al Science vol. 273 pp. 1185-1189, 1996.

(Continued)

*Primary Examiner*—William C. Dowling
(74) *Attorney, Agent, or Firm*—Sherr & Nourse, PLLC (57) ABSTRACT

A system and a method of a transparent color image display utilizing fluorescence conversion (FC) of nano-particles and molecules are disclosed. In one preferred embodiment, a color image display system consists of a light source equipped with two-dimensional scanning hardware and a FC display screen board. The FC display screen board consists of a transparent fluorescence display layer, a wavelength filtering coating, and an absorption substrate. In another preferred embodiment, two mechanisms of light excitation are utilized. One of the excitation mechanisms is up-conversion where excitation light wavelength is longer than fluorescence wavelength. The second mechanism is down-conversion where excitation wavelength is shorter than fluorescence wavelength. A host of preferred fluorescence materials for the FC screen are also disclosed. These materials fall into four categories: inorganic nanometer sized phosphors; organic molecules and dyes; semiconductor based nano particles; and organometallic molecules. These molecules or nano-particles are incorporated in the screen in such a way that allows the visible transparency of the screen. Additionally, a preferred fast light scanning system is disclosed. The preferred scanning system consists of dual-axes acousto-optic light deflector, signal processing and control circuits equipped with a close-loop image feedback to maintain position accuracy and pointing stability of the excitation beam.

79 Claims, 4 Drawing Sheets

U.S. PATENT DOCUMENTS

| | | | |
|---|---|---|---|
| 4,989,956 A | 2/1991 | Wu et al. | |
| 5,045,706 A * | 9/1991 | Tanaka et al. | 250/483.1 |
| 5,078,462 A * | 1/1992 | Gravisse | 359/359 |
| 5,142,387 A | 8/1992 | Shikama et al. | |
| 5,162,160 A | 11/1992 | Matsui et al. | |
| 5,233,197 A | 8/1993 | Bowman et al. | |
| 5,289,315 A | 2/1994 | Makita et al. | |
| 5,347,644 A | 9/1994 | Sedlmayr | |
| 5,424,535 A | 6/1995 | Albion et al. | |
| 5,473,396 A * | 12/1995 | Okajima et al. | 353/122 |
| 5,566,025 A | 10/1996 | Knoll et al. | |
| 5,646,479 A | 7/1997 | Troxell | |
| 5,684,621 A | 11/1997 | Downing | |
| 5,764,403 A | 6/1998 | Downing | |
| 5,784,162 A | 7/1998 | Cabib et al. | |
| 5,786,582 A | 7/1998 | Roustaei et al. | |
| 5,914,807 A | 6/1999 | Downing | |
| 5,921,650 A | 7/1999 | Doany et al. | |
| 5,943,160 A | 8/1999 | Downing | |
| 5,956,172 A | 9/1999 | Downing | |
| 5,957,560 A | 9/1999 | Do et al. | |
| 6,128,131 A * | 10/2000 | Tang | 359/443 |
| 6,166,852 A | 12/2000 | Miro | |
| 6,221,112 B1 | 4/2001 | Snider | |
| 6,261,402 B1 | 7/2001 | Watanabe et al. | |
| 6,327,074 B1 | 12/2001 | Bass et al. | |
| 6,337,769 B1 | 1/2002 | Lee | |
| 6,439,888 B1 | 8/2002 | Boutoussov et al. | |
| 6,466,184 B1 * | 10/2002 | Whitesell et al. | 345/6 |
| 6,501,590 B1 | 12/2002 | Bass et al. | |
| 6,507,436 B1 | 1/2003 | Nishikawa et al. | |
| 6,654,161 B1 | 11/2003 | Bass et al. | |
| 6,769,773 B1 | 8/2004 | Wu | |
| 6,809,781 B1 | 10/2004 | Setlur et al. | |
| 6,870,671 B1 * | 3/2005 | Travis | 359/443 |
| 6,897,999 B1 * | 5/2005 | Bass et al. | 359/326 |
| 2001/0005282 A1 | 6/2001 | Etori et al. | |
| 2002/0024495 A1 | 2/2002 | Lippert et al. | |
| 2002/0048058 A1 | 4/2002 | Nishikawa et al. | |
| 2002/0088925 A1 | 7/2002 | Nestorovic et al. | |
| 2002/0120916 A1 | 8/2002 | Snider, Jr. | |
| 2002/0140338 A1 | 10/2002 | Sluzky | |
| 2002/0190224 A1 | 12/2002 | Tazaki | |
| 2003/0198456 A1 | 10/2003 | Steiner et al. | |
| 2003/0213967 A1 | 11/2003 | Forrest et al. | |
| 2003/0214724 A1 | 11/2003 | Fujikawa et al. | |
| 2003/0227004 A1 | 12/2003 | Dopps | |
| 2004/0022071 A1 | 2/2004 | Cheng et al. | |
| 2004/0041988 A1 | 3/2004 | Kitamura | |
| 2004/0070551 A1 | 4/2004 | Walck et al. | |
| 2004/0090794 A1 | 5/2004 | Ollett et al. | |
| 2004/0100692 A1 | 5/2004 | Hou | |
| 2004/0114219 A1 | 6/2004 | Richardson | |
| 2004/0135976 A1 | 7/2004 | Ishihara et al. | |
| 2004/0149998 A1 | 8/2004 | Henson et al. | |
| 2004/0164669 A1 | 8/2004 | Kawaguchi et al. | |
| 2005/0030617 A1 | 2/2005 | Umeya | |
| 2005/0063054 A1 * | 3/2005 | Umeya | 359/443 |
| 2005/0088736 A1 * | 4/2005 | Ghozeil et al. | 359/443 |
| 2005/0088737 A1 * | 4/2005 | Piehl | 359/443 |
| 2005/0174635 A1 * | 8/2005 | Bruegl et al. | 359/443 |

OTHER PUBLICATIONS

Murray, "Head-up displays get second glance", EE Times, Jan. 5, 2004.
E-Window Product Web Page. www.nano-proprietary.com
Rockwell Collins Product Web Page, www.rockwellcollins.com.
Steigerwald et al., "Illumination With Solid State Lighting Technology", IEEE Journal on Selected Topics in Quantum Electronics, Mar. 2002, vol. 8, No. 2.
Jeon et al. "A novel famrication method for a 64×64 matrix-addressable GaN-based micro-LED array", Phys. Stat. Sol. (a) 200, No. 1, pp. 79-82 (2003).
Hawkyard, "The release of disperse dyes during thermal processing" Journal of the society of dyes and colourists, vol. 97 (1981) 213-219.
ProScreenlnc Product Web Page. www.proscreeninc.com.
Web Page from www.smartmotorist.com.
Iwaya, et al., "High Power UV-Light-Emitting Diode on Sapphire", Jpn. J. Appl. Phys. vol. 42(2003) pp. 400-403.
Coosemans et al., "MT-compatible . . . datalinks", Materials Science In Semiconductor Processsing, vol. 3 (2000) pp. 475-480.
"Handbook of Plastics, Elastomers, and Composites" Harper, C. McGraw-Hill, 3rd Ed (1996).
Xiao-Dong (Ted) Sun, etc. Identification and optimization of advanced phosphors using combinatorial libraries Appl. Phys. Lett., vol. 70, No. 25, Jun. 23, 1997.
"A Three- Color, Solid- State, Three Dimensional Display", E. Downing et al. Science vol. 273, pp. 1185-1189, 1996.
J. Lewis et al., IEEE Trans Election Devices vol. 18 pp. 724, 1971.

* cited by examiner

SYSTEM AND METHOD FOR A TRANSPARENT COLOR IMAGE DISPLAY UTILIZING FLUORESCENCE CONVERSION OF NANO PARTICLES AND MOLECULES

This application claims priority to the provisional application entitled "Advanced laser fluorescent displays", Ser. No. 60/471,968, filed by the same subject inventors and assignee as the subject invention on May 19, 2003.

BACKGROUND OF THE INVENTION

1. Field of the Invention

The present invention relates generally to displays and more particularly to a system and a method for two-dimensional transparent displays utilizing special laser induced fluorescence media.

2. Background Art

Figure 1:
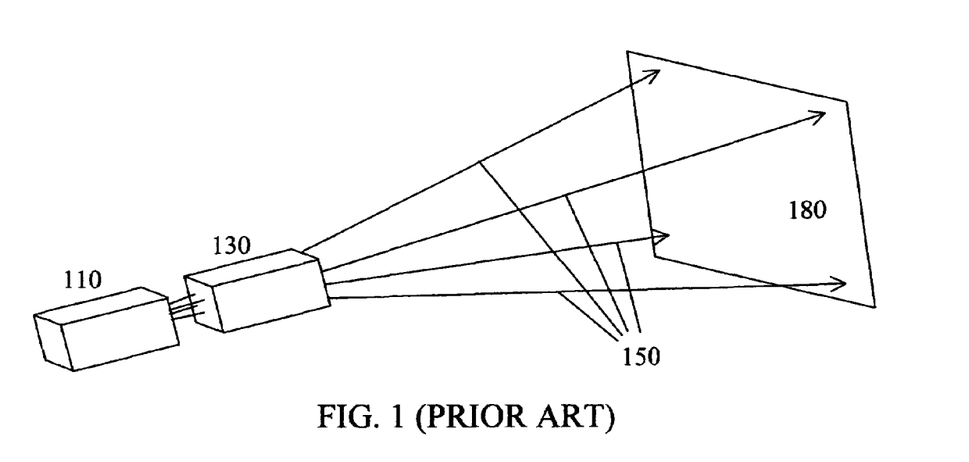
FIG. 1 illustrates a prior art light beam based image display.
Figure 2:
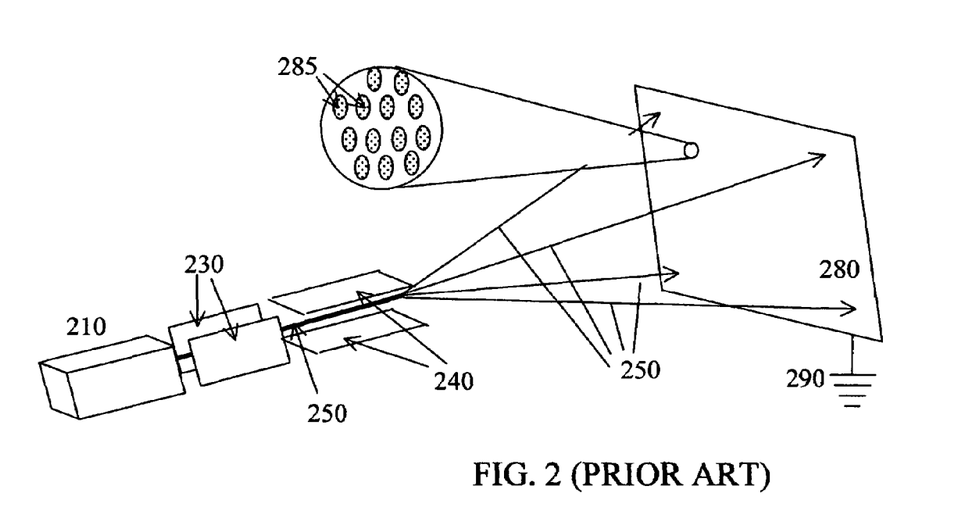
FIG. 2 shows the structure of a prior art electron beam based image display.

Image display and associated technologies are a fundamental necessity of today's society. Application areas include communication, entertainment, military, medical and health. Traditionally, a display system consists of a source beam, beam masks or deflectors, and a projection screen. Although the basic concept of a display system served us well in the past, new technologies have been developed steadily. As demonstrated in FIG. 1, a prior art light beam based display system consists of a collimated light source 110, a light masking or deflecting unit 130, and the modified light beam (150) strikes a display screen 180. Typical example of this type of displays are: movie and film display systems, liquid crystal based display, MEMs and liquid crystal based reflective light projection systems for TV and computer. In these light based systems, the image can be viewed on the same side of the projection system as in the case of a movie display, or on the opposite side of the projection system, as in the case of back illuminated large screen projection TV. A common element in these light based display system is that the displaying screen does not change the color (or wavelength) of the illumination light. The screen preferably be opaque to increase scattering of the illuminated light to the viewers. Also the intensity of a particular color component is modulated, and/or the beam position is scanned. In FIG. 2, a prior art electron beam based display system is illustrated. These systems are used in Cathode Ray Tube (CRT) based displays for TV and computers and are gradually being replaced by liquid crystal based flat panel displays. A typical CRT display consists of an electron gun 210, horizontal and vertical beam deflecting conductive plates 230 and 240, and a conductive screen 280. A well-collimated electron beam is deflected by periodically changed electrical fields and strikes certain location of the screen at a specified time. The conductive screen is coated with phosphor particles that convert absorbed electrons into photons of a particular color. The intensity of the electron beam is controlled to regulate intensity patterns displayed on the CRT screen. The CRT screen is normally grounded or maintained at certain electrical potential to avoid charge build up. In order to operate properly, these CRT systems are evacuated and sealed in a glass vacuum tube (not shown). In both situations, the display screens are opaque and people can only see the information on the display surface but cannot see through the screens.

Recently, several research groups have studied the potential of using light conversion as a mean to two- and three-dimensional displays. Of particular interests are the work by E. Downing et. al, as described in an article entitled: "A three-color, Solid-state, Three-dimensional Display" published in Science, vol. 273, pp. 1185–89, 1996. The work described in the Science article formed basis for several US patents granted. See for example, U.S. Pat. Nos. 5,684,621; 5,764,403; 5,914,807; 5,943,160; and U.S. Pat. No. 5,956,172 all to Downing. M. Bass and co-workers, at the University at Central Florida, carried out other related research works. Several related US patents were issued. See for example, U.S. Pat. Nos. 6,327,074; 6,501,590; and 6,654,161; to Bass and co-inventors. These patents and article are thereby included herein by ways of reference.

The research work of Downing et. al, and M. Bass and co-inventors all employed a two color excitation scheme called up-conversion. In an up-conversion process, an absorption center must absorb at least two longer wavelength photons to emit one photon with a shorter wavelength. While Downing et. al, used a solid display material (fluoride ZBLAN glass) doped with rare earth cations, M. Bass and co-workers investigated the use of both dye doped plastics micron sized particles as well as rare earth cation containing fluoride micron particles ($NaYF_4$) as display medium. The major difference is that the former uses solid glass layers whereas the latter uses solid particle sizes from 0.5 μm to 50 μm. The major drawback for both methods is the use of multiple lasers as the excitation sources. The use of multiple lasers is normally required for the up-conversion process due to the inefficiency of the process. The use of very intense, infrared lasers substantially limits the practical applicability of the research works and may introduce safety hazards for the viewers. For each displaying color, two laser beams with specified laser wavelengths need to be used to generate a particular color. Therefore, in order to realize a three-color display, a three-layered display solid structure doped with three color-specific emitters (rare earth cations, or dyes) together with six excitation lasers have to be used.

There are several areas that can be improved on these prior art two- and three-dimensional displays. For instance, it is desirable to use a single excitation laser to generate all three colors. Also desirable is methods using one laser for each color instead of the two lasers per color methods used in these prior art displays. Even more desirable is the use of regular dark light sources (e.g. Light emitting diodes or arc lamps of UV-blue emission) and fluorescent "down-conversion" materials for a 2-D display with transparent screen. Inexpensive manufacturing processes are also the key to a practical display technology. There is a need therefore to have improvements to these prior arts such that inexpensive displays with reduced number of laser sources can be made.

SUMMARY OF THE INVENTION

The present invention discloses an improved system and method, materials and designs of an image display that utilizes fluorescence conversion (FC) process. The disclosed display consists of an excitation light source, a visibly transparent display screen containing fluorescent materials or particles, photo-acoustic light beam steering mechanisms, and a feedback loop. Once illuminated, the fluorescent screen converts the invisible (or less visible) excitation lights into red, green or blue emissions. Rastering or scanning of the excitation beam according to a predefined or a programmed data generates an image on the fluorescent screen.

Two schemes of FC are disclosed: The first scheme is termed down-conversion, where the excitation wavelength is shorter than fluorescence wavelength; the second scheme is called up-conversion, where laser wavelengths is longer than fluorescence wavelength. In the second case, two or more photons from the laser are necessary to excite the fluorescence particle in order to yield a visible fluorescence photon. A common approach for the first scheme is to apply a UV (or blue) light with wavelength shorter than 500 nm to excite the fluorescence molecules or particles on the image screen; the UV light sources include solid state lasers, semiconductor laser diodes, gas lasers, dye lasers, excimer lasers, and other UV-blue sources including LEDs, Xenon, mercury, or metal halide arc lamps, and other dark lamps familiar to those skilled in the art A common approach for the second scheme is to apply infrared (IR) lasers with wavelength longer than 700 nm to excite the fluorescence molecules or particles on the Screen. The IR lasers include solid-state lasers, semiconductor laser diodes and other IR sources familiar to those skilled in the art. In both cases, excitation light intensities are modulated to yield visible fluorescence of varying intensity or gray scales.

To display multiple colors on the screen, fluorescent molecules or nano-particles of different emitting wavelengths are deposited on the displaying screen or dissolved in the screen; multiple excitation light sources of different wavelengths may be combined and illuminated on the screen. Composite displaying colors are obtained through the mixing of three basic fluorescent emitting colors. Molecules or nano-particles with different fluorescent colors are either premixed and deposited as a single layer; or are deposited as a multiple-layered structure on the displaying screen. These molecules and nano-particles are so small that they will not scatter the visible light and block the view through the transparent screen.

A host of preferred fluorescence materials are also disclosed. These materials fall into four categories: inorganic nano-meter sized phosphors; organic molecules and dyes; semiconductor based nano particles (quantum dots); and organometallic molecules.

Two methods of image display are disclosed. In the first preferred method, expanded static light beams are applied through a matrix of on-off switches (e.g., a matrix of tiny reflective mirrors), and a fluorescent image is created on the transparent displaying screen. Static images are typically generated from a lookup table. In the second preferred method, a light beam is coupled with a two-dimensional laser scanner (e.g., galvanometer, acousto-optic light deflector (AOLD), and electro-optic light deflector (EOLD)). Electrical signals are applied to steer the light beam to illuminate a particular spot on the screen at a given time. Additionally, signal processing and control circuits are used and equipped with a close-loop image feedback to maintain position accuracy and pointing stability of the laser beam.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 5 illustrates an improved FC image display systems.

DETAILED DESCRIPTION OF THE INVENTION

The present invention discloses an improved system and method, materials and designs of a transparent image display that utilizes fluorescence conversion (FC) process. The improved display system disclosed herein consists of an excitation light source, a transparent display screen containing fluorescent molecules or nano-particles, photo-acoustic light beam steering mechanisms, and a feed back mechanism. Once illuminated, the fluorescent screen converts the invisible (or less visible) excitation lights into red, green or blue emissions. Rastering or scanning of the excitation beam according to a predefined or a programmed data generates an image on the fluorescent screen.

Figure 3:
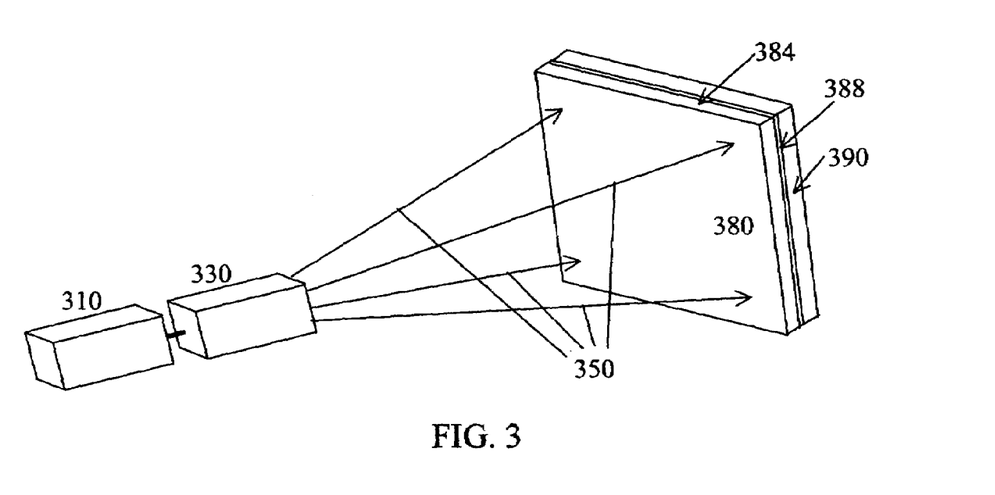
FIG. 3 displays an improved fluorescence conversion image display system.

The first preferred embodiment of the present invention is illustrated in FIG. 3. A radiation source 310 delivers an intense, collimated beam of invisible (or less visible) radiation. The radiation beam passes an optical image processor 330 and the modified radiation beam 350 is projected on to a FC displaying screen 380. Two methods of image display are disclosed. In the first preferred method, expanded static radiation beams are applied through an image processor 330 contains a matrix of on-off switches (e.g., a matrix of tiny reflective mirrors) creating a dark image, and a fluorescent visible image is created on the displaying screen 380 through fluorescent conversion of the dark image. Static images are typically generated from a lookup table. In the second preferred method, a radiation beam is coupled with an image processor 330 contains a two-dimensional beam scanner (e.g., galvanometer, acousto-optic light deflector (AOLD), and electro-optic light deflector (EOLD)). Electrical signals are applied to steer the radiation beam to illuminate a particular spot of the screen at a given time. The preferred FC screen typically has the following structure: a layer 384 contains fluorescent nano-particles or molecules attached to or dispersed in a uniform medium; a coating 388 reflects the visible emission while transmitting the invisible radiation; and a substrate layer 390 that absorbs the remaining invisible radiation. Alternatively, it comprises of a layer 384 containing fluorescent nano-particles or molecules attached to or dispersed in a uniform medium; a coating 388 absorbing the invisible radiation; and a visibly transparent substrate layer 390. Self-adhesive layer and protective layers such as scratch resistance layer can also be added to the screen structure.

Figure 4A:
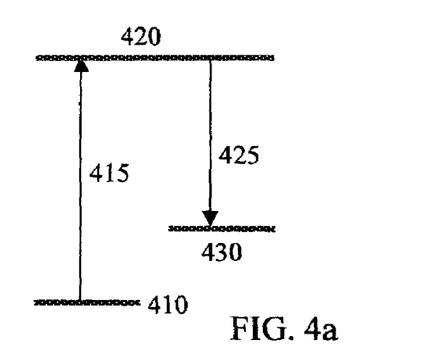
FIGS. 4a and 4b depict energy level diagrams associated with down-conversion and up-conversion FC schemes.
Figure 4B:
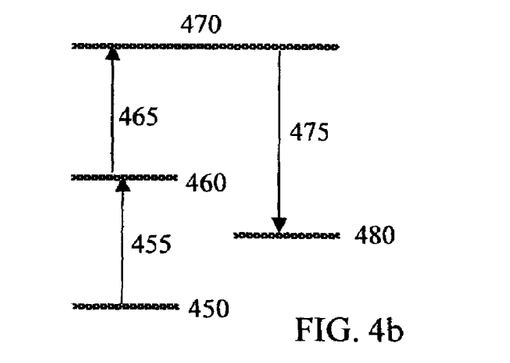
Figure 5A:
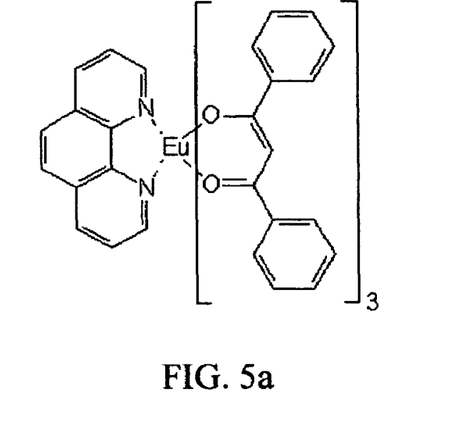
FIGS. 5a through 5e provide chemical structure information of 5 organometallic molecules that can be used in the fluorescent screen.
Figure 5B:
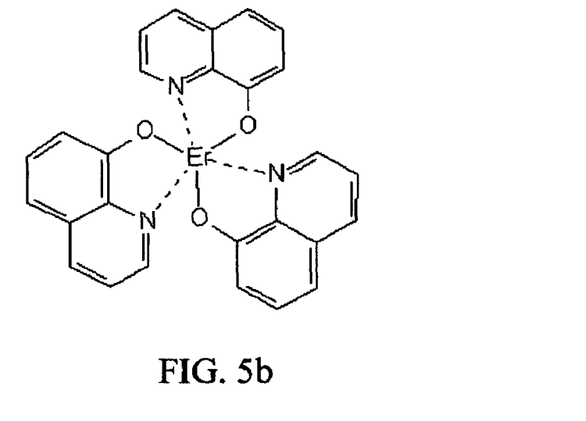
Figure 5C:
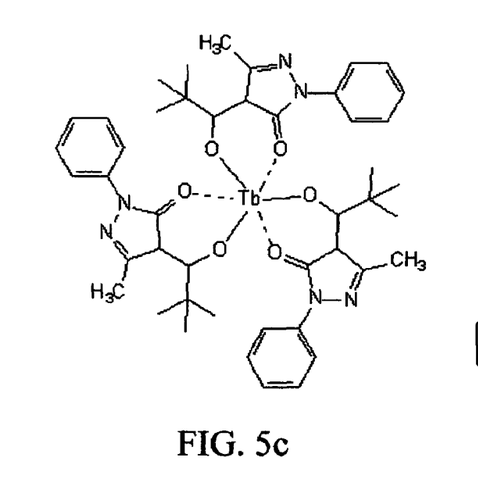
Figure 5D:
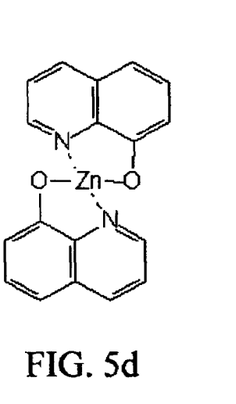
Figure 5E:
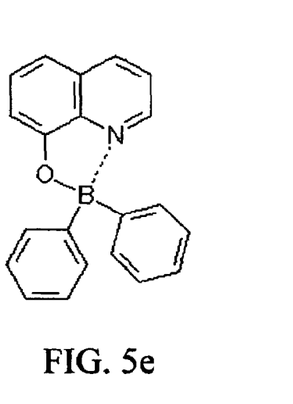

Two preferred schemes of FC are disclosed and illustrated in FIGS. 4A and 4B, respectively. The first scheme is termed down-conversion, where the wavelength of the excitation light is shorter than fluorescence wavelength. FIG. 4A illustrates an energy level diagram of the down-conversion molecule or nano-particle. The photon of the shorter wavelength excitation light has more energy and induces a transition 415 from a lower energy level 410 to a higher energy level 420. The emission involves transition 425 associated with two energy levels with a smaller energy gap. The second scheme is called up-conversion, where excitation wavelengths are longer than fluorescence wavelength. In the second case, two or more photons from a laser are necessary to excite the fluorescence particle in order to yield a visible fluorescence photon. FIG. 4B illustrates an energy level diagram of the FC molecules or nano-particles associated with the second scheme. The longer wavelength excitation laser induces two transitions (455, 465) from a lower state 450 to a higher energy state 470 through an intermediate state 460. The emission involves transition 475 associated with two energy levels with an energy gap that is smaller than energy associated with two laser photons. A common approach for the first scheme is to apply a UV (or blue) light source with wavelength shorter than 500 nm to excite the fluorescence molecules or nano-particles on the image screen; the UV sources include solid state lasers, semiconductor laser diodes, gas lasers, dye lasers, excimer lasers, and other UV light sources familiar to those skilled in the art. A common approach for the second scheme is to apply infrared (IR) lasers with wavelength longer than 700 nm to excite the fluorescence molecules or particles on the Screen. The IR lasers include solid-state lasers, semiconductor laser diodes and other IR sources familiar to those skilled in the art. In both cases, excitation beam intensities are modulated to yield visible fluorescence of varying intensity or gray scales.

A host of preferred fluorescence materials are also disclosed. A common property of these materials is that the size of the fluorescent particles is very small. Typically, nano-particles or molecules with size between 0.5 nm to 500 nm are preferred to have minimum scattering effect that reduce the visible transparency of the screen. These materials fall into four categories: inorganic nano-meter sized phosphors; organic molecules and dyes; semiconductor based nano particles; and organometallic molecules.

For down-conversions the following materials are preferred to form FC displaying screen:

1. Inorganic or ceramic phosphors or nano-particles, including but not limited to metal oxides, metal halides, metal chalcoginides (e.g. metal sulfides), or their hybrids, such as metal oxo-halides, metal oxo-chalcoginides. These inorganic phosphors have found wide applications in fluorescent lamps and electronic monitors. These materials can covert shorter wavelength photon (e.g. UV and blue) into longer wavelength visible light and can be readily deposited on displaying screens or dispersed in the screen.
2. Laser dyes and small organic molecules, and fluorescent organic polymers. These can also be used to convert shorter wavelength laser photon (e.g. UV and blue) into longer wavelength visible light and can be readily deposited on a displaying screen. Since they are in the molecular state in the solid, the screen transparency is maintained due to lack of particle scattering.
3. Semiconductor nano-particles, such as II–VI or III–V compound semiconductors, e.g. fluorescent quantum dots. Again, their addition in the screen does not affect the optical transparency
4. Organometallic molecules. The molecules include at least a metal center such as rare earth elements (e.g. Eu, Tb, Ce, Er, Tm, Pr, Ho) and transitional metal elements such as Cr, Mn, Zn, Ir, Ru, V, and main group elements such as B, Al, Ga, etc. The metal elements are chemically bonded to organic groups to prevent the quenching of the fluorescence from the hosts or solvents. Such organomettalic compounds filled screen does not scatter light or affect the screen transparency either, unlike the micro-sized particles.

Of the down-conversion FC materials or molecules mentioned above, those that can be excited by lasers of long wave UV (e.g. >300 nm) to blue (<500 nm), and yield visible light emission are preferred for the current invention. For example, the phosphors can be Garnet series of phosphors: $(Y_mA_{1-m})_3(Al_nB_{1-n})_5O_{12}$, doped with Ce; where $0 \leq m$, $n \leq 1$; A include other rare earth elements, B include B, Ga. In addition, phosphors containing metal silicates, metal borates, metal phosphates, and metal aluminates hosts are preferred in their applications to FC displays; In addition, nano-particulates phosphors containing common rare earth elements (e.g. Eu, Tb, Ce, Dy, Er, Pr, Tm) and transitional or main group elements (e.g. Mn, Cr, Ti, Ag, Cu, Zn, Bi, Pb, Sn, Tl) as the fluorescent activators, are also preferred in their applications to FC displays. Finally, some undoped materials (e.g. Metal (e.g. Ca, Zn, Cd) tungstates, metal vanadates, ZnO, etc) are also preferred FC display materials.

The commercial laser dyes are another class of preferred FC display materials. A list of commercial laser dyes can be obtained from several laser dye vendors, including Lambda Physik, and Exciton, etc. A partial list of the preferred laser dye classes includes: Pyrromethene, Coumarin, Rhodamine, Fluorescein, other aromatic hydrocarbons and their derivatives, etc. In addition, there are many polymers containing unsaturated carbon-carbon bonds, which also serve as fluorescent materials and find many optical and fluorescent applications. For example, MEH-PPV, PPV, etc have been used in opto-electronic devices, such as polymer light emitting diodes (PLED). Such fluorescent polymers can be used directly as the fluorescent layer of the transparent 2-D display screen.

In addition, the recently developed semiconductor nanoparticles (e.g., quantum dots) are also a preferred LIF display materials. The terms "semiconductor nanoparticles," refers to an inorganic crystallite between 1 nm and 1000 nm in diameter, preferably between 2 nm to 50 nm. A semiconductor nano-particle is capable of emitting electromagnetic radiation upon excitation (i.e., the semiconductor nano-particle is luminescent). The nanoparticle can be either a homogeneous nano-crystal, or comprises of multiple shells. For example, it includes a "core" of one or more first semiconductor materials, and may be surrounded by a "shell" of a second semiconductor material. The core and/or the shell can be a semiconductor material including, but not limited to, those of the group II–VI (ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, and the like) and III–V (GaN, GaP, GaAs, GaSb, InN, InP, InAs, InSb, and the like) and IV (Ge, Si, and the like) materials, and an alloy or a mixture thereof.

Finally, fluorescent organometallic molecules containing rare earth or transitional element cations are also preferred in the down-conversion fluorescent screens. Such molecules include a metal center of rare earth elements including Eu, Tb, Er, Tm, Ce protected with organic chelating groups. The metal center may also include transitional elements such as Zn, Mn, Cr, Ir, etc and main group elements such as B, Al, Ga. Such organometallic molecules can readily dissolved in liquid or transparent solid host media and form a transparent fluorescent screen for the disclosed 2-D transparent display with minimum light scattering. Some examples of such fluorescent organomettalic molecules include: 1. Tris(dibenzoylmethane)mono(phenanthroline)europium(III); 2. Tris (8-hydroxyquinoline)erbium; 3. Tris(1-phenyl-3-methyl-4-(2,2-dimethylpropan-1-oyl)pyrazolin-5-one)terbium(III); 4. Bis(2-methyl-8-hydroxyquinolato)zinc; 5. Diphenylborane-8-hydroxyquinolate. Their molecular structures are given in FIGS. 5a through 5e.

Up-conversion phosphors are similar in chemical compositions as the down-conversion fluorescent materials discussed. The up-conversion phosphors for the fluorescent conversion display also include the following choice of materials or molecules:
1. Laser dyes, the organic small molecules that can be excited by the absorption of at least two infrared photons with emission of visible light.
2. Fluorescent polymers, the class of polymers that can be excited by the absorption of at least two infrared photons with emission of visible light
3. Inorganic or ceramic particles or nano-particles, including the conventional up-conversion phosphors (e.g. metal fluorides, metal oxides) that can be excited by the absorption of at least two infrared photons with emission of visible light
4. Semiconductor particles, including nano-particles such as II–VI or III–V compound semiconductors, e.g. quantum dots, described in details in the "down-conversion" semiconductors above.

The fluorescent up-conversion inorganic phosphors include but are not limited to metal oxides, metal halides, metal chalcoginides (e.g. sulfides), or their hybrids, such as metal oxo-halides, metal oxo-chalcoginides. They are usually doped with rare earth elements (e.g. $Yb^{3+}$, $Er^{3+}$, $Tm^{3+}$). Some host examples include, but not limited to: $NaYF_4$, $YF_3$, $BaYF_5$, $LaF_3$, $La_2MoO_8$, $LaNbO_4$, $LnO_2S$; where Ln is the rare earth elements, such as Y, La, Gd).

These preferred FC displaying materials may be used to form a variety of FC displaying objects. These objects include: screens, plates, windows, walls, billboards, and other displaying surfaces. There are several means to incorporate these fluorescent molecules or materials onto a displaying surface:
1. They can be dissolved (organic dyes) or dispersed (inorganic particles) into solvents (water or organic solvents). The liquid fluorescent formula can be either coated onto a surface and form a solid film or coating after drying, or they can be sandwiched between two surfaces in liquid form.
2. They can be dissolved (organic dyes) or dispersed (inorganic particles) into solid hosts, such as glasses, polymers, gels, inorganic-organic hybrid hosts, cloths, papers, films, tapes, etc. and turn the solid into a fluorescent object for laser display.
3. Some objects (e.g. cloths, paper, tapes, fluorescent polymers) may already contain fluorescent molecules or luminescent functional groups. In that circumstance, they can be directly used as laser display objects.

Figure 6:
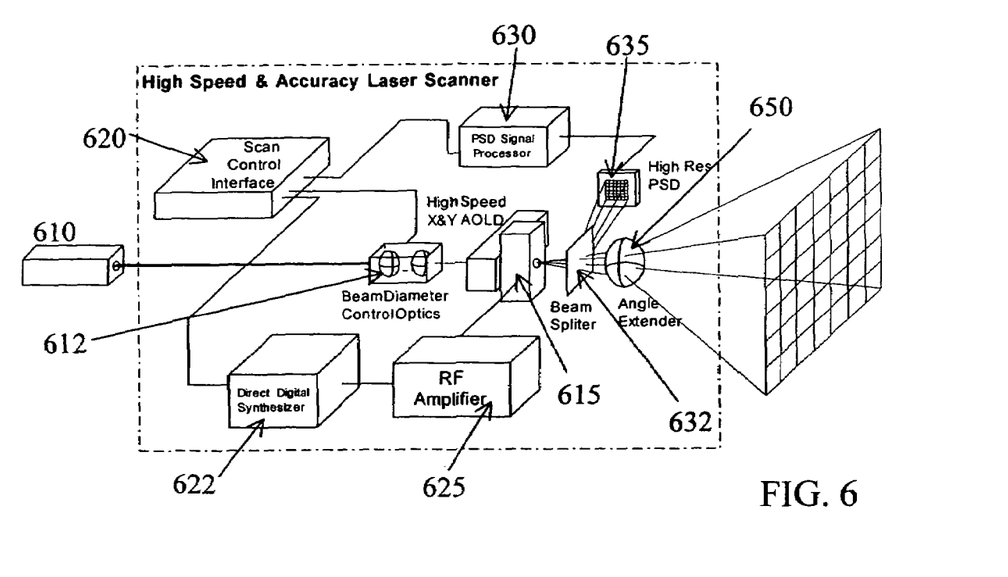

Referring now to FIG. 6, a detailed diagram illustrates an additional preferred embodiment of a two-dimensional light beam based FC display subsystem. The excitation source 610 preferably passes through a set of beam-diameter control optics 612 and a 2-D acousto-optical scanner 615. A scan control interface unit 620 coordinates the functions of a Direct Digital Synthesizer 622, an RF amplifier 625 and Beam-Diameter Control Optics 612. The processes image beam is projected on to a FC screen through an angle extender 650. In order to deliver consistent and stable image on the FC screen, a beam splitter deflects the image into a position sensitive detector 635 and processed through 630, feedback to 620. The close-loop image feedback formed by 632, 635, 630 and 620 is incorporated to maintain position accuracy and pointing stability of the laser beam.

It will be apparent to those with ordinary skill of the art that many variations and modifications can be made to the system, method, material and apparatus of FC based display disclosed herein without departing from the spirit and scope of the present invention. It is therefore intended that the present invention cover the modifications and variations of this invention provided that they come within the scope of the appended claims and their equivalents.

We claim:
1. A two-dimensional color image display setup with visibly transparent screen based on fluorescence conversion comprising:
   at least one excitation light beam operating in a wavelength range of >700 nm or <450 nm;
   an optical imaging processing unit projecting the said light beam to specified positions with specified light intensities;
   a displaying screen comprising at least one layer of transparent medium containing at least one type of electro-magnetic radiation activated visible light emitting ingredients, wherein the said electro-magnetic radiation activated visible light emitting ingredients containing laser dye or organic molecules with dimensions between 0.5 nm to 100 nm;
   a coating attached to the said layer of transparent medium of the said displaying screen separating the said visible light from the said excitation light;
   a covering layer of transparent materials protecting the said transparent layer of medium containing the said visible light emitting particles of the said displaying screen.
2. The two-dimensional color image display setup recited in claim 1 wherein the said covering layers being glass plates.
3. The two-dimensional color image display setup recited in claim 1 wherein the said covering layers being polymer material.
4. The two-dimensional color image display setup recited in claim 1 wherein the said transparent medium of the said fluorescent layer being a transparent liquid.
5. The two-dimensional color image display setup recited in claim 1 wherein the said transparent medium of the said fluorescent layer being a transparent solid.
6. The two-dimensional color image display setup recited in claim 1 wherein the said electro-magnetic radiation activated visible light emitting particles absorbing electro-magnetic radiation in the wavelength range <450 nm or <700 nm while emitting visible light in the wavelength range >700 nm and >450 nm.
7. The two-dimensional color image display setup recited in claim 1 wherein the said electro-magnetic radiation activated visible light emitting particles containing semiconductor elements with dimensions between 1 nm to 1 μm.
8. The two-dimensional color image display setup recited in claim 1 wherein the said electro-magnetic radiation activated visible light emitting particles containing fluorescent organic polymers that are coated to the said displaying screen.
9. The two-dimensional color image display setup recited in claim 1 wherein the said electro-magnetic radiation activated visible light emitting particles containing inorganic phosphors with dimensions between 1 nm to 500 nm.
10. The two-dimensional color image display setup recited in claim 1 wherein the said electro-magnetic radiation activated visible light emitting particles containing at least one type of metallic element (atoms or ions)being chemically bonded to an organic compound with molecular dimensions between 0.5 nm to 500 nm.
11. A transparent fluorescence conversion screen for two-dimensional color image display comprising:
    at least one fluorescent layer of transparent medium containing at least one type of electro-magnetic radia- tion activated visible light emitting particles, wherein the said electro-magnetic radiation activated visible light emitting particles containing laser dye or organic molecules with dimensions between 0.5 nm to 100 nm;

a coating attached to the said layer of transparent medium separating the said visible light from the said activation radiation;

a covering layer of transparent materials protecting the said fluorescent layer.

12. The transparent fluorescence conversion screen recited in claim 11 wherein the said covering layers being glass plates.

13. The transparent fluorescence conversion screen recited in claim 11 wherein the said covering layers being polymer material.

14. The transparent fluorescence conversion screen recited in claim 11 wherein the said transparent medium of the said fluorescent layer being a transparent liquid.

15. The transparent fluorescence conversion screen recited in claim 11 wherein the said transparent medium of the said fluorescent layer being a transparent solid.

16. The transparent fluorescence conversion screen recited in claim 11 wherein the said electro-magnetic radiation activated visible light emitting particles absorbing electro-magnetic radiation in the wavelength range <450 nm or >700 nm while emitting visible light in the wavelength range <700 nm and >450 nm.

17. The transparent fluorescence conversion screen recited in claim 11 wherein the said electro-magnetic radiation activated visible light emitting particles containing semiconductor elements with dimensions between 1 mm to 1 μm.

18. The transparent fluorescence conversion screen recited in claim 11 wherein the said electro-magnetic radiation activated visible light emitting particles containing organic polymer coated to the said display screen.

19. The transparent fluorescence conversion screen recited in claim 11 wherein the said electro-magnetic radiation activated visible light emitting particles contains inorganic phosphors with dimensions between 1 mm to 500 nm.

20. The transparent fluorescence conversion screen recited in claim 11 wherein the said electro-magnetic radiation activated visible light emitting particles contains at least one type of metallic element (atoms or ions) being chemically bonded to an organic compound with molecular dimensions between 0.5 nm to 500 nm.

21. The transparent fluorescence conversion screen recited in claim 11 wherein the said transparent medium of the said fluorescent layer having thickness of 1 μm to 1 cm.

22. The transparent fluorescence conversion screen recited in claim 11 wherein the said screen having diagonal measuring from 5 cm to 10 meters.

23. The transparent fluorescence conversion screen recited in claim 11 wherein the said screen is attached to the windshield of a moving object (automobile, aircraft or boat).

24. The transparent fluorescence conversion screen recited in claim 11 wherein the said screen is attached to the window of a building.

25. An apparatus comprising light emitting material integrated into a substantially transparent substrate, wherein:

the light emitting material is configured to emit visible light in response to absorption of at least one of light having a wavelength less than approximately 500 nanometers and light having a wavelength greater than approximately 700 nanometers;

the light emitting material comprises a plurality of light emitting particles; and each of the plurality of light emitting particles has a diameter less than about 500 nanometers.

26. The apparatus of claim 25, wherein each of the plurality of light emitting particles has a diameter greater than about 0.5 nanometers.

27. The apparatus of claim 25, wherein each of the plurality of light emitting particles has a diameter greater than about 1 nanometers.

28. The apparatus of claim 27, wherein each of the plurality of light emitting particles has a diameter greater than about 2 nanometers.

29. The apparatus of claim 25, wherein each of the plurality of light emitting particles has a diameter less than about 450 nanometers.

30. The apparatus of claim 29, wherein each of the plurality of light emitting particles has a diameter less than about 400 nanometers.

31. The apparatus of claim 30, wherein each of the plurality of light emitting particles has a diameter less than about 300 nanometers.

32. The apparatus of claim 31, wherein each of the plurality of light emitting particles has a diameter less than about 200 nanometers.

33. The apparatus of claim 32, wherein each of the plurality of light emitting particles has a diameter less than about 100 nanometers.

34. The apparatus of claim 33, wherein each of the plurality of light emitting particles has a diameter less than about 50 nanometers.

35. The apparatus of claim 25, wherein the apparatus is a monochromatic display.

36. The apparatus of claim 25, wherein the light emitting material comprises:

a first material which emits a first visible color; and a second material which emits a second visible color, which is different from the first visible color.

37. The apparatus of claim 36, wherein the light emitting material comprises a third material which emits a third visible color, which is different from the first visible color and the second visible color.

38. The apparatus of claim 37, wherein the first visible color, the second visible color, and the third visible color are primary colors.

39. The apparatus of claim 38, wherein the primary colors are red, green, and blue.

40. The apparatus of claim 36, wherein the first material and the second material are integrated into the substantially transparent substrate as a mixture.

41. The apparatus of claim 36, wherein the first material and the second material are integrated into the substantially transparent substrate as layers on a surface of the substantially transparent substrate.

42. The apparatus of claim 36, wherein:

the first visible color is emitted according to selective projection of light having a first wavelength; and the second visible color is emitted according to selective projection of light having a second wavelength.

43. The apparatus of claim 42, wherein a fourth color is emitted by a combination of substantially simultaneous selective projection of light having the first wavelength and the second wavelength.

44. The apparatus of claim 43, wherein the fourth color is a non-primary color.

45. The apparatus of claim 25, wherein the at least one of light having a wavelength less than approximately 500 nanometers and light having a wavelength greater than approximately 700 nanometers is emitted from a laser apparatus.

46. The apparatus of claim 25, wherein the light emitting material is configured to emit visible light in response to absorption of light having a wavelength less than approximately 500 nanometers.

47. The apparatus of claim 46, wherein the light emitting material is configured to emit visible light in response to absorption of ultraviolet light.

48. The apparatus of claim 46, wherein the light emitting material is a fluorescent down-conversion material.

49. The apparatus of claim 25, wherein the light emitting material is configured to emit visible light in response to absorption of light having a wavelength greater than approximately 700 nanometers.

50. The apparatus of claim 49, wherein the light emitting material is configured to emit visible light in response to absorption of infrared light.

51. The apparatus of claim 49, wherein the light emitting material is a fluorescent up-conversion material.

52. The apparatus of claim 25, wherein the light emitting material comprises europium.

53. The apparatus of claim 52, wherein the europium is comprised in an organometallic material.

54. The apparatus of claim 25, wherein the light emitting material comprises terbium.

55. The apparatus of claim 54, wherein the terbium is comprised in an organometallic material.

56. The apparatus of claim 25, wherein the light emitting material comprises at least one of:
   inorganic particles;
   ceramic particles;
   nanoparticles;
   a laser dye;
   pyrromethene;
   coumarin;
   rhodamine;
   fluorescein;
   aromatic hydrocarbons;
   derivatives of aromatic hydrocarbons;
   polymers containing unsaturated bonds;
   small organic molecules;
   fluorescent polymers;
   fluorescent organic polymers;
   semiconductor particles;
   inorganic crystallite;
   homogeneous nano-crystals;
   nanoparticles each having at least one shell;
   II–VI compound semiconductors;
   III–V compound semiconductors; and
   fluorescent quantum dots.

57. The apparatus of claim 56, wherein the light emitting material is a nanoparticle having a core and at least one shell.

58. The apparatus of claim 57, wherein:
   the core comprises a first semiconductor material; and
   the at least one shell comprises a second semiconductor material.

59. The apparatus of claim 58, wherein the first semiconductor material and the second semiconductor material comprise materials from at least one of:
   group II–VI semiconductors;
   group III–V semiconductors; and
   group IV semiconductors.

60. The apparatus of claim 25, wherein the light emitting material comprises at least one of:
   a metal oxide;
   a metal fluoride;
   a metal halide;
   a metal chalcoginide; and
   a metal sulfide.

61. The apparatus of claim 60, wherein the light emitting material is doped with rare earth elements.

62. The apparatus of claim 23, wherein the tight emitting material comprises a Garnet series phosphor doped with Cerium, wherein:
   the Garnet series phosphor is represented by $(Y_m A_{1-m})_3 (Al_n B_{1-n})_5 O_{12}$;
   $0 \leq m$ and $n \leq 1$;
   A comprises rare earth elements; and
   B comprises at teast one of boron and gallium.

63. The apparoatus of claim 25, wherein the light emitting material comprises at least one of:
   metal silicates;
   metal borates;
   metal phosphates; and
   metal aluminates.

64. The apparatus of claim 25, wherein the light emitting material comprises at least one rare earth element.

65. The apparatus of claim 25, wherein the light emitting material comprises at least one transitional metal element.

66. The apparatus of claim 25, wherein the light emitting material comprises at least one main group element.

67. The apparatus of claim 25, wherein the light emitting material comprises undoped fluorescent material.

68. The apparatus of claim 67, wherein the undoped material comprises at least one of:
   metal tungstates;
   calcium;
   zinc;
   cadmium;
   metal vanadates; and
   zinc oxide.

69. The apparatus of claim 25, wherein the light emitting material comprises at least one of:
   a polymer;
   a MEH-PPV polymer; and
   a PPV polymer.

70. The apparatus of claim 25, wherein the light emitting material comprises organometallic molecules.

71. The apparatus of claim 70, wherein the light emitting material comprises a metal center comprising at least one rare earth element protected with at least one material of organic chelating groups.

72. The apparatus of claim 70, wherein the light emitting material comprises a metal center comprising at least one transitional element.

73. The apparatus of claim 70, wherein the light emitting material comprises a metal center comprising at least one main group element.

74. The apparatus of claim 70, wherein the light emitting material comprises at least one of:
   Tris(dibenzoylmethane)mono(phenanthroline)europium (III);
   Tris(8-hydroxyquinoline)erbium;
   Tris(1-phenyl-3-methyl-4-(2,2-dimethylpropan-1-oyl)-pyrazolin-5-one)terbium(III);
   Bis(2-methyl-8-hydroxyquinolato)zinc; and
   Diphenylborane-8-hydroxyquinolate.

75. The apparatus of claim 25, wherein said at least one of light having a wavelength less than approximately 500 nanometers and light having a wavelength greater than approximately 700 nanometers is emitted from a laser.

76. The apparatus of claim 75, wherein the laser is modulated by a galvanometer.

77. The apparatus of claim 75, wherein the laser is modulated by an acousto-optic light defector.

78. The apparatus of claim 75, wherein the laser is modulated by an electro-optic light deflector.

79. A method comprising integrating light emitting material into a substantially transparent substrate, wherein:

the light emitting material is configured to emit visible light in response to absorption of at least one of light having a wavelength less than approximately 500 nanometers and light having a wavelength greater than approximately 700 nanometers;

the light emitting material comprises a plurality of light emitting particles; and each of the plurality of light emitting particles has a diameter less than about 500 nanometers.

* * * * *